US 6,658,343 B1

(12) United States Patent
Koch et al.

(10) Patent No.: US 6,658,343 B1
(45) Date of Patent: Dec. 2, 2003

(54) METHOD AND DEVICE FOR STABILIZING A VEHICLE EQUIPPED WITH A SLIP-CONTROLLED BRAKE SYSTEM

(75) Inventors: Matthaeus Koch, Illingen (DE); Steffen Ullmann, Stuttgart (DE); Ruediger Poggenburg, Vaihingen/Enz (DE); Oliver Lah, Weissach (DE); Stefan Diehle, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/856,029

(22) PCT Filed: Sep. 13, 2000

(86) PCT No.: PCT/DE00/03182

§ 371 (c)(1),
(2), (4) Date: Aug. 20, 2001

(87) PCT Pub. No.: WO01/19652

PCT Pub. Date: Mar. 22, 2001

(30) Foreign Application Priority Data

Sep. 16, 1999 (DE) .......................................... 199 44 329

(51) Int. Cl.[7] ................................................. G06F 7/00
(52) U.S. Cl. .............................. 701/71; 701/72; 701/83
(58) Field of Search ............................ 701/71, 72, 69, 701/70, 75, 78, 79, 81, 82, 83, 84, 88–92, 87; 303/138, 139, 141, 143, 156; 180/197, 198, 247

(56) References Cited

FOREIGN PATENT DOCUMENTS

| DE | 2 112 669 | 10/1972 |
| DE | 42 30 295 | 3/1994 |
| DE | 196 43 179 | 4/1997 |
| DE | 196 28 980 | 1/1998 |

OTHER PUBLICATIONS

"FDR—Die Fahrdynamikregelung von Bosch", ATZ Automobiltechnische Zeitschrft, vol. 96, No. 11, (1994), pp. 674–689.

"Antiblockiersystem (ABS) fuer Personenkraftwagen", Bosch Technische Berichte, vol. 7, No. 2, 1980, ISSN 006–789 X.

*Primary Examiner*—Richard M. Camby
(74) *Attorney, Agent, or Firm*—Kenyon & Kenyon

(57) ABSTRACT

A method of stabilizing a vehicle equipped with a slip-controlled brake system is described. This is done by determining the wheel speeds of the individual wheels of the vehicle. For at least one wheel, a wheel speed setpoint is determined. For the at least one wheel, a deviation quantity describing the deviation between the wheel speed determined for that wheel and the setpoint is determined. To stabilize the vehicle, actuators assigned to the at least one wheel are activated as a function of this deviation quantity.

7 Claims, 5 Drawing Sheets

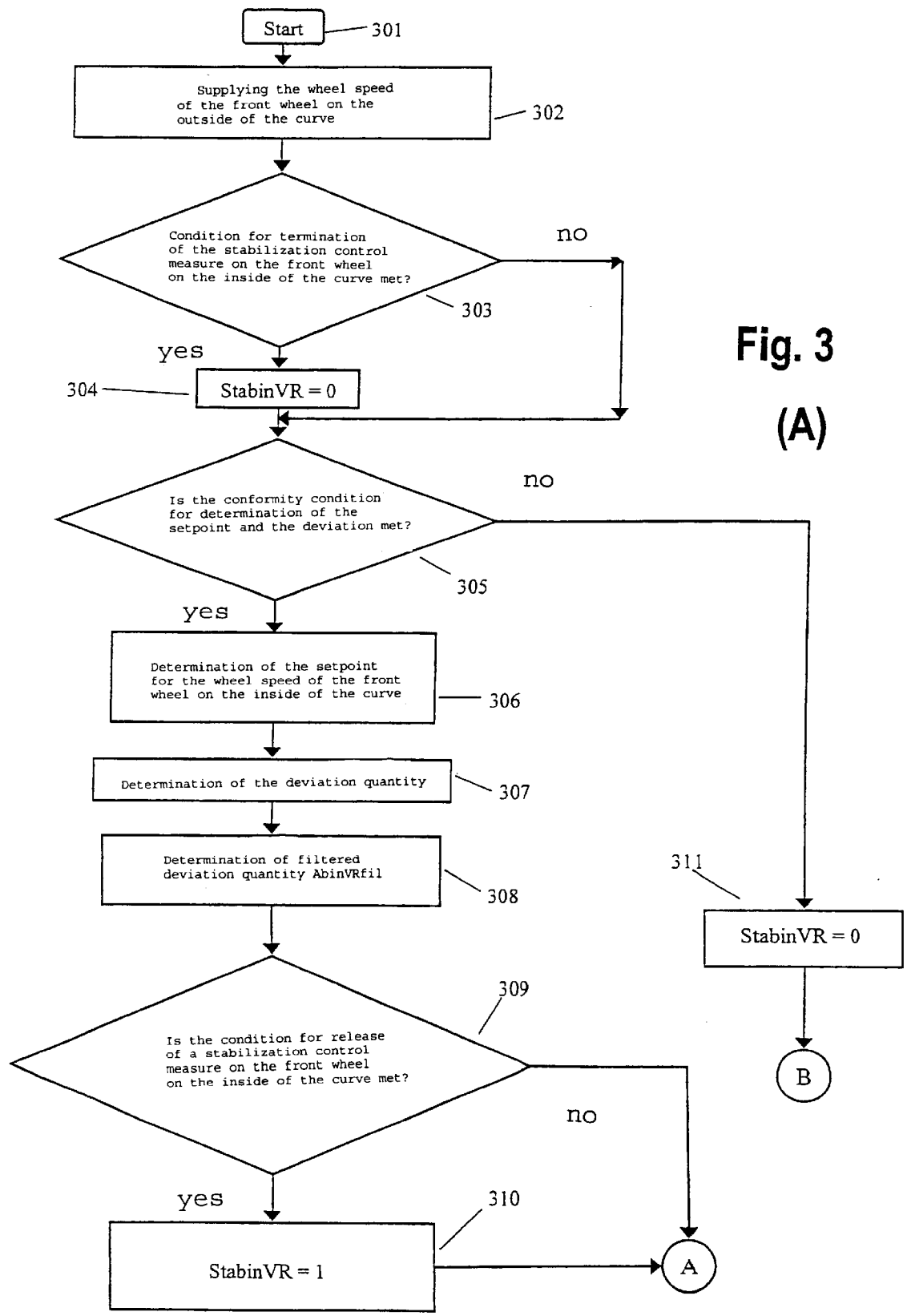

METHOD AND DEVICE FOR STABILIZING A VEHICLE EQUIPPED WITH A SLIP-CONTROLLED BRAKE SYSTEM

FIELD OF THE INVENTION

The present invention relates to a method and a device for stabilizing a vehicle equipped with a slip-controlled brake system.

BACKGROUND INFORMATION

A stabilization device for passenger vehicles is described in the article "FDR—Die Fahrdynamikregelung von Bosch", published in the automotive engineering journal ATZ Automobiltechnische Zeitschrift, vol. 96, no. 11 (1994) pp. 674–689. With this stabilization device, the yaw rate and float angle of the vehicle are regulated by the control system. This is done by determining a control deviation between the actual values and the setpoint values for the float angle and the yaw rate. Starting with these setpoints, changes in setpoint slip which are implemented through appropriate engine control measures and/or brake control measures are determined. With the help of brake control measures, it is possible to increase or reduce the brake pressure on individual wheels according to the changes in setpoint slip.

A system for brake slip control is described in the article "Antiblockiersystem (ABS) für Personenkraftwagen", published in "Bosch Technische Berichte", volume 7, (1980, no. 2, ISSN 006-789 X). In this system, the actual slip is compared with a setpoint slip during a braking operation, and as soon as the actual slip is equal to the setpoint slip, the brake pressure on the respective wheel is reduced.

For example, German Published Patent Application No. 2 112 669 describes an anti-lock device which controls wheel slip in such a way that maximum braking forces between the road surface and the tire are possible. This anti-lock device has a control device with which the anti-lock protection can be influenced when the longitudinal axis of the vehicle deviates from the direction of travel. This control device includes a final controlling element which automatically reduces wheel slip to a value at which lateral guidance of the wheel is improved significantly with hardly any noticeable reduction in brake pressure. The final controlling element reacts to the direction in which the vehicle travels along a curve. Among other things, this anti-lock device causes the braking force on the inside of the curve to be reduced and the braking force on the outside of the curve to be increased.

All the devices described above as belonging to the related art use wheel slip as a controlled variable to implement measures influencing the wheel.

SUMMARY OF THE INVENTION

The present invention provides a method and a device using an alternative controlled variable other than wheel slip so that measures to influence the wheels can be implemented on the basis of this alternative controlled variable.

The present invention provides a method for stabilizing a vehicle equipped with a slip-controlled brake system. In this method, wheel speeds are determined for the individual wheels of the vehicle. As an alternative to the slip, as a controlled variable, the wheel speed is used in the method according to the present invention. For this reason, a setpoint value for the wheel speed is determined for at least one wheel. A deviation quantity describing the deviation between the wheel speed determined for this wheel, and the setpoint value is determined for the at least one wheel. To stabilize the vehicle, the actuators assigned to the at least one wheel are controlled as a function of this deviation quantity.

Slip is a relative quantity; in other words, if slip is controlled by activating the actuators assigned to the wheel, then the wheel speed that will result after activating the actuators is not always known in advance. Wheel speed, however, is an absolute quantity. If wheel speed is regulated by activating the actuators assigned to the wheel, then the wheel speed which results after activating the actuators can be set at a desired level. Thus when traveling along curves, for example, the wheel speed resulting after activating the actuators can be adapted to the actual curve turned.

The method and device according to the present invention are to be used in vehicles equipped with an anti-lock control unit. This is not a restriction on the scope. Use in vehicles equipped with traction control or a form of slip control such as that described in the above-mentioned ATZ article is also possible.

Vehicles may also tend to oversteer during turning even in the partial braking range. If a vehicle is equipped with a brake slip control system, it can be stabilized with the help of the method according to the present invention. To stabilize the vehicle, pressure-modulating control measures which are not brake slip control measures per se can be implemented on the front axle.

In addition, due to the load reduction on the front wheel on the inside of the curve, vehicles equipped with a brake slip control system can be brought under brake slip control with this wheel very quickly. This can be perceptible in the pedal itself and from noises which constitute an impairment of driving comfort. The method according to the present invention can also prevent the front wheel on the inside of the curve from coming under brake slip control with even slight braking due to the load reduction at higher transverse accelerations. With the method according to the present invention, an improvement in both stability and comfort is achieved with brake slip control systems.

The slip-controlled brake system used with the device according to the present invention is one in which at least the brake slip of individual wheels of a vehicle can be controlled. The vehicle is in the partial braking range during this stabilization.

The at least one wheel whose actuators are activated as a function of the deviation quantity can be a wheel on the inside of the curve. In a further embodiment, it can be desired that the at least one wheel is the front wheel on the inside of the curve. The actuators are activated so that the braking effect prevailing on the wheel on the inside of the curve is reduced in comparison with the braking effect prevailing on the wheel on the same axle but on the outside of the curve. The following is achieved with the method of influencing the front wheel on the inside of the curve as described above. Since the method according to the present invention is designed primarily for a vehicle equipped with a slip-controlled brake system, only a control measure that reduces the braking effect and is to be implemented independently of the driver may be considered as a stabilizing control measure on the actuators assigned to the wheels. An increase in braking effect may not happen because such brake systems that operate by hydraulic or pneumatic means do not have any means for increasing pressure independently of the driver so that ultimately an increase in braking effect can be achieved. With the method according to the present invention, the tendency of the vehicle to oversteer is to be counteracted, so a yaw moment with an understeering effect must be produced. Since only a reduction in braking effect can be implemented independently of the driver, as mentioned above, it must be implemented on the wheels on the inside of the curve in order to achieve a yaw moment with an understeering effect. The front wheel on the inside of the curve is selected because due to the load distribution the transmission of force to this wheel on the inside of the curve can be more favorable than that to the rear wheel on the inside of the curve.

The setpoint for wheel speed as a function of the wheel speed of the wheel on the outside of the curve which is on the same axle as the wheel on the inside of the curve is used advantageously for the wheel speed. This type of determination is performed because the wheel on the outside of the curve is especially stable when traveling along curves because of the load distribution of the vehicle. It is likewise advantageous if the difference in wheel speeds which results when traveling along curves for wheels on the inside and outside of the curve is taken into account in determining the setpoint. This can be accomplished by determining the setpoint as a function of a quantity describing the radius of the curve being turned.

An embodiment of the present invention further provides a two-step procedure for determination of the setpoint. First, an intermediate quantity is determined as a function of the wheel speed of the wheel on the outside of the curve on the same axle as the wheel on the inside of the curve and/or as a function of a quantity describing the radius of the curve being turned. This intermediate quantity describes the wheel speed expected for the wheel on the inside of the curve due to traveling along a curve. The radius of the curve being turned is determined as a function of the vehicle speed and the transverse acceleration acting on the vehicle. In other words, the intermediate quantity thus determined represents the speed of the wheel on the inside of the curve which this wheel must theoretically have for a certain curve radius and a certain transverse acceleration if cornering effects are to be taken into account. Even if the wheel on the outside of the curve does have some slip in comparison with the vehicle speed, determining the intermediate quantity in this way can still be used. In this case, the wheel on the inside of the curve and the wheel on the outside of the curve are certain to have equal amounts of slip. In other words, there is no difference in slip between the two wheels. In a second step, the intermediate quantity is weighted with a predetermined factor to determine the setpoint. This weighting should be done in such a manner that the setpoint is reduced by a predetermined proportion in comparison with the intermediate quantity due to this weighting. This achieves the result that the wheel speed set on the wheel on the inside of the curve will correspond to the given conditions due to cornering in any case. The smaller the predetermined proportion by which the intermediate quantity is reduced, the more braking force is transmitted by a the front wheel on the inside of the curve.

The deviation quantity is the difference, based on the setpoint, between the wheel speed determined for the at least one wheel and the setpoint. This deviation quantity has the nature of slip due to its determination. This deviation quantity can be filtered, which is done by using a PT1 element known from the related art. The actuators are activated as a function of the filtered deviation quantity. Filtering the deviation quantity ensures that the noise of the speed signals does not have an interfering effect. In addition, short-term disturbances from the road surface are also damped.

The deviation quantity is compared with upper and lower threshold values. The actuators are then activated as a function of this comparison, so that the deviation quantity remains within the value range defined by the upper and lower threshold values and/or is guided into this range.

The actuators can be activated so that the braking effect prevailing on the at least one wheel is reduced when the deviation quantity is lower than the lower threshold value and/or it is retained when the deviation quantity is greater than the lower threshold value and less than the upper threshold value and/or it is increased when the deviation quantity is greater than the upper threshold value. In this way, the deviation quantity is kept within the value range described above.

In activating the actuators, a check is performed to determine whether a condition, according to which an increase in braking effect on the at least one wheel is to be suppressed, is met, and in the case when this condition is met, instead of increasing the braking effect, it is kept constant. This procedure is based on the following state of affairs. If actuators assigned to the front wheel on the inside of the curve are activated according to the present invention to stabilize the vehicle, there is an increase in load on the wheel on the inside of the curve as the vehicle travels more slowly and the radius of the curve remains the same. This leads to a reduction in slip on this wheel. Therefore, the actuators may be activated in such a way that a braking effect is produced. For example, if it is a hydraulic brake system, there will be an increase in pressure on this wheel. These increases in pressure are not absolutely necessary at a low speed and low deceleration, but they have a negative effect on pedal comfort due to the buildup pulse series until the admission pressure level is reached. To suppress this negative effect on pedal comfort, a pressure buildup is suppressed when such a situation is detected and instead the pressure and thus the braking effect are kept constant.

According to a further embodiment of the present invention, the setpoint and/or deviation quantity is determined when a corresponding conformity condition is met and/or activation of the actuators of the at least one wheel is released when a corresponding release condition is met and/or activation of the actuators of the at least one wheel is terminated when a corresponding termination condition is met.

DETAILED DESCRIPTION

Figure 1:
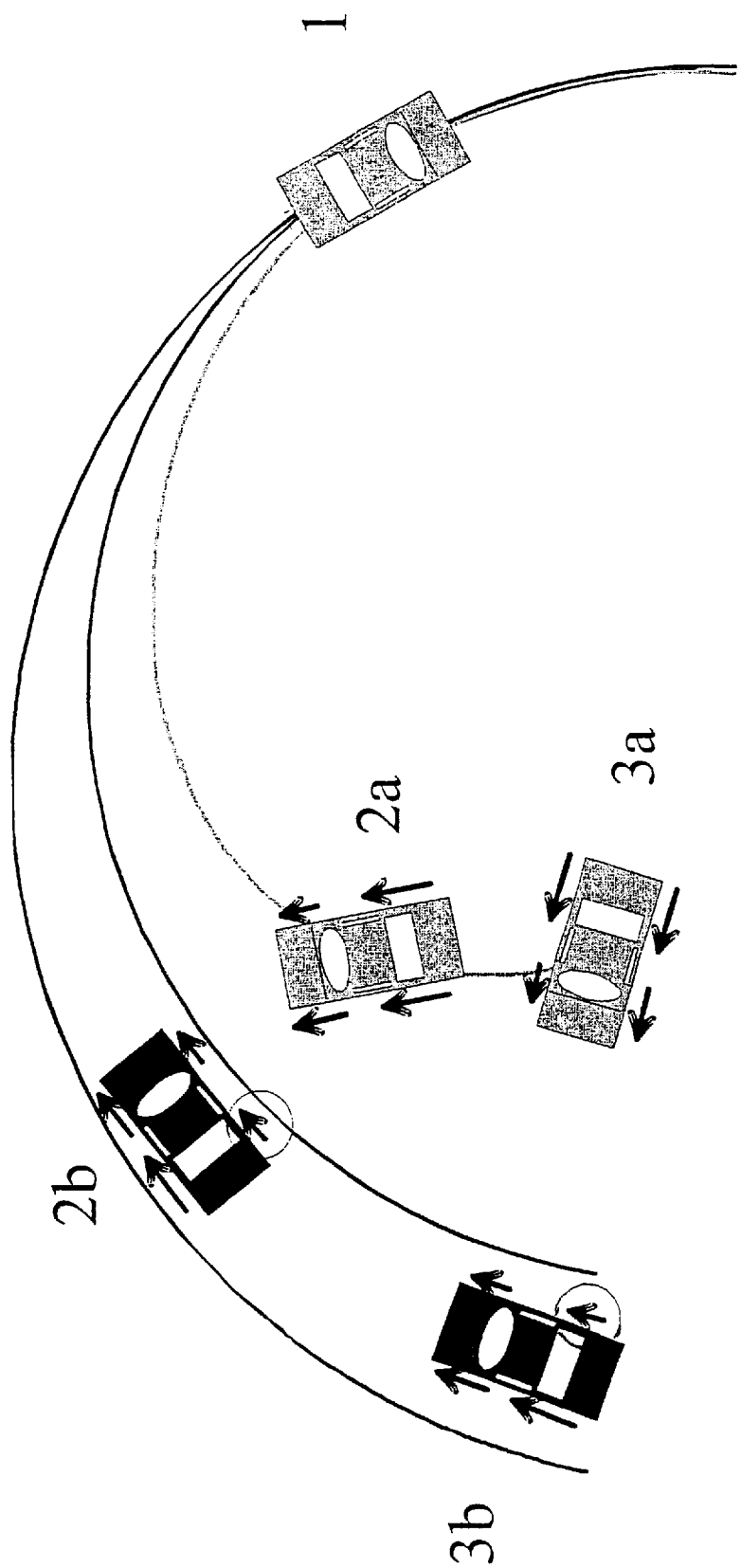
FIG. 1 shows a diagram having two vehicles in a partial braking range while traveling along a curve.

FIG. 1 shows two vehicles (a) and (b) at different times 1, 2a and 3a as well as 2b and 3b, these vehicles being in the partial braking range, shown here when the vehicles are traveling along a curve. The rectangular window indicates the front side of the vehicle and the oval window defines the rear of the vehicle. Vehicle (a) is not equipped with the device according to the present invention. However, vehicle (b) does contain the device according to the present invention. The arrows shown in the longitudinal direction for the two vehicles represent the braking force applied to the respective wheel. It can be seen from this diagram that both vehicle (a) and vehicle (b) are equipped with a slip-controlled brake system which allows individual control for the rear wheels. This is indicated by arrows of different lengths in the rear area of the vehicle. Representation in time increments 2a and 3a in the diagram indicates that both front wheels of vehicle (a) are braked to an equal extent, i.e., the braking force is the same on the two front wheels. As a result, the vehicle oversteers as indicated. In other words, the distance traveled by vehicle (a) has a tighter curve radius than the driver originally intended on the basis of the selected steering angle. As represented by time increments 2a and 2b in FIG. 1, the two front wheels of vehicle (b) are braked to different extents. The braking effect on the front wheel on the inside of the curve is less than the braking effect on the front wheel on the outside of the curve. As a result, a yaw moment which counteracts the oversteering tendency of the vehicle is applied to the vehicle. The vehicle conforms to the driver's intent which is set by the steering angle.

Figure 2:
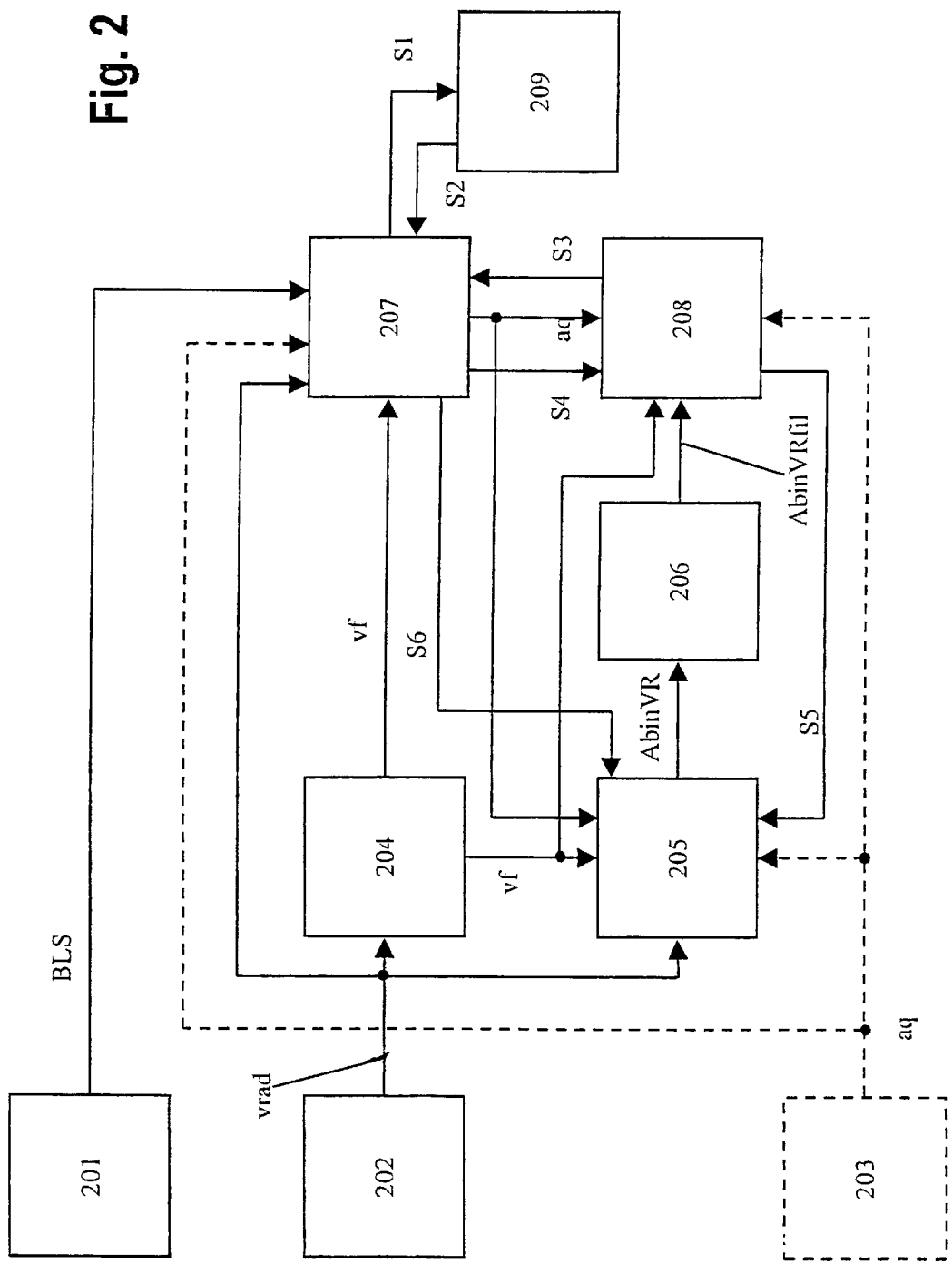
FIG. 2 shows a block diagram of an exemplary device of the present invention.

FIG. 2 illustrates the device in a block diagram according to the present invention. Block 201 represents a brake light switch with which operation of the brake pedal by the driver is detected. Brake light switch 201 produces a signal BLS which represents operation of the brake pedal and is sent to a block 207. Block 202 represents means with which wheel speeds vrad are determined for the individual wheels of the vehicle. Wheel speeds vrad are sent to blocks 204 and 205 as well as block 207. Means 202 may be wheel rpm sensors, for example, having a corresponding analyzer unit with which the wheel rpm thus determined is converted to wheel speed.

In block 204, a quantity vf describing the vehicle speed is determined as a function of wheel speeds vrad sent to that block. This may be accomplished by averaging, where individual wheels may be weighted differently depending on how suitable they are for determining the speed of the vehicle. Quantity vf describing the vehicle speed is sent from block 204 to block 207 and block 205 as well as a block 208.

Block 207 mentioned above represents the control core of the device according to the present invention. This control core 207 should contain all the functions of a control core in a control unit for brake slip control. In addition to these functions, control core 207 should have the relevant functions in conjunction with the method according to the present invention. One of these functions is to provide a quantity aq describing the transverse acceleration acting on the vehicle. Quantity aq is determined in control core 207 as a function of wheel speeds vrad. If it is a front wheel drive vehicle, for example, quantity aq is determined as a function of the rear wheels, i.e., the non-driven wheels. To do so, the difference in wheel speeds of the right and left wheels may be analyzed, for example. Quantity aq is sent to blocks 205 and 208.

FIG. 2 shows a block 203 representing a transverse acceleration sensor. The dotted lines in the diagram indicate that this is an option or an alternative. In other words, the presence of transverse acceleration sensor 203 is not necessary for implementation of the method according to the present invention. However, there are known brake slip control systems having such a sensor. In this case, the transverse acceleration detected with the help of transverse acceleration sensor 203 may be used instead of the transverse acceleration determined from the wheel speeds. This is indicated by the dotted line indicating transverse acceleration aq sent from block 203 to blocks 207, 205 and 208.

A setpoint vsollinVR for the wheel speed of the front wheel on the inside of the curve is determined in block 205. Since this setpoint is determined as a function of the wheel speed of the front wheel on the outside of the curve according to the present invention, information regarding which wheel of the vehicle is the front wheel on the outside of the curve must be sent to block 205. As a function of the setpoint vsollinVR, a deviation quantity AbinVR is then determined, describing the deviation between the wheel speed determined for the front wheel on the inside of the curve and setpoint vsollinVR. The setpoint and/or the deviation quantity is then determined when a corresponding conformity condition is met. Consequently, appropriate information must be sent to block 205. This information is sent from block 208 to block 205 via signals or quantities S5. The information regarding the front wheel on the outside of the curve is sent from block 207 to block 205 via signals or quantities S6. The method of providing signals S5 and S6 is explained in greater detail below. Determination of setpoint vsollinVR and deviation quantity AbinVR is described in conjunction with FIG. 3. Deviation quantity AbinVR is sent from block 205 to a block 206.

Block 206 is a filter means with which a filtered deviation quantity AbinVRfil is determined as a function of deviation quantity AbinVR. The effects of noise contained in the wheel speeds and short-term disturbances from the road surfaces are eliminated or damped by this filtering. Filter means 206 may be, for example, a known PT1 element from the related art. Filtered deviation quantity AbinVRfil is sent from block 206 to block 208.

In block 208, filter deviation quantity AbinVRfil is compared with an upper threshold value and a lower threshold value. The actuators of the front wheel on the inside of the curve are activated as a function of this comparison so that the filter deviation quantity remains within and/or is brought into the value range defined by the upper and lower threshold values. It should be pointed out here that it is also conceivable to omit filtering of the deviation quantity. In this case, it is not the filtered deviation quantity that is processed in block 208, but instead the deviation quantity itself is processed. Signals or quantities S3 produced as a function of these comparisons contain information regarding how the actuators of the front wheel on the inside of the curve are to be activated and these signals are sent to control core 207. This is described in greater detail in conjunction with FIG. 3. Activation of the actuators of the front wheel on the inside of the curve is released when a corresponding release condition is met and/or since control of the actuators of the front wheel on the inside of the curve is terminated when a corresponding termination condition is met, so suitable information must be sent from block 207 to block 208. This is accomplished through signals or quantities S4. The individual information contained in signals or quantities S4 will be described in greater detail in conjunction with FIG. 3.

Control core 207 produces signals or quantities S1 by means of which actuators 209 belonging to the brake system are activated. Actuators 209 are first activated according to a conventional brake slip control system, and in the other case they are activated by the method according to the present invention. In other words, signals or quantities S1 contain the setpoint information of a conventional brake slip control system superimposed on the setpoint information of the method according to the present invention. Signals or quantities S2 which provide control core 207 with information regarding the status of actuators 209 is sent from actuators 209 to control core 207.

Figure 3:
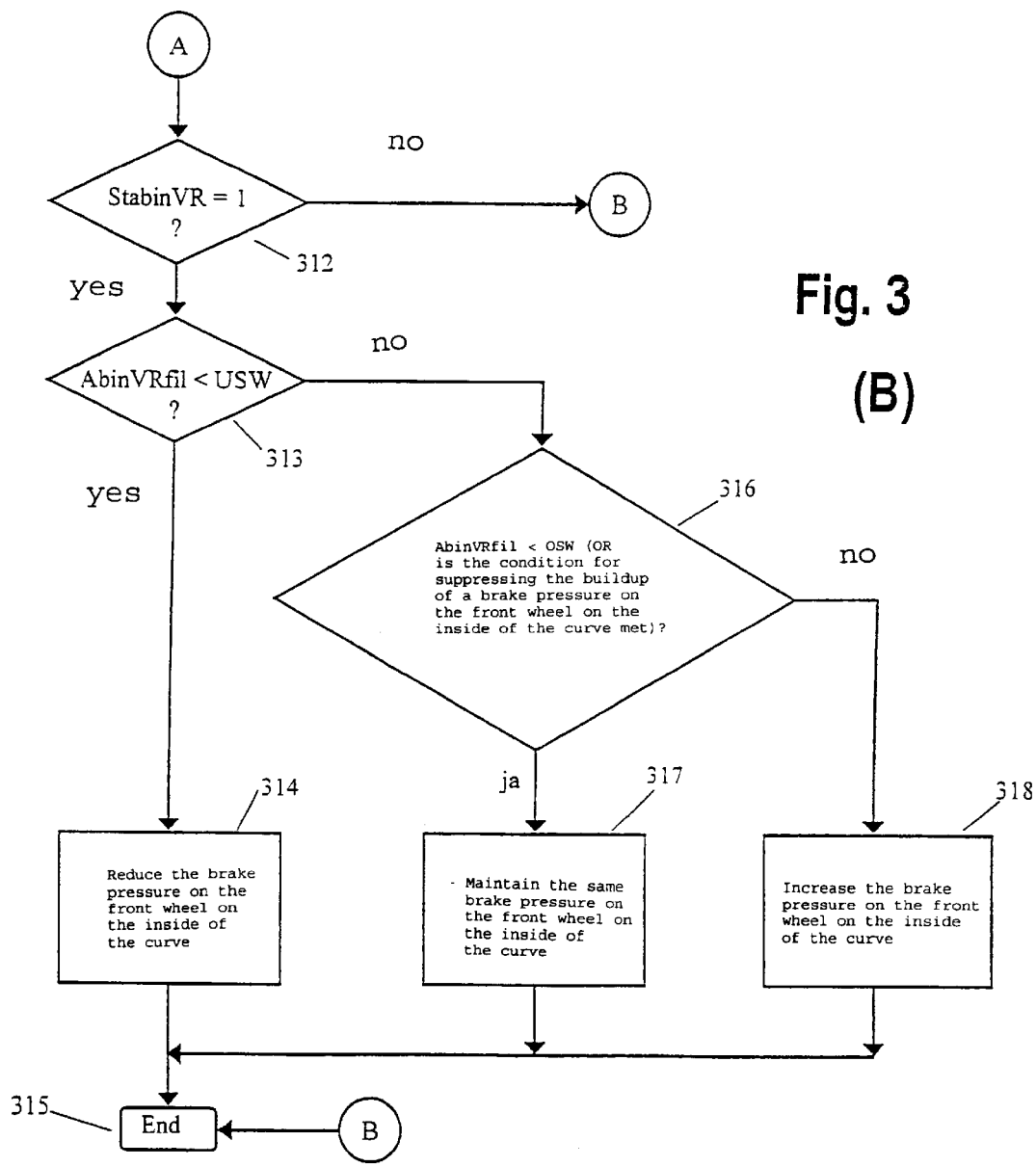
FIG. 3a shows a flow chart.
FIG. 3b shows a flow chart.

In FIG. 3, including FIGS. 3a and 3b, the method according to the present invention begins with a step 301, followed by a step 302. In step 302, the wheel speed of the front wheel on the outside of the curve is made available. This takes place in block 205, which is described above. To do so, block 205 needs information regarding which of the vehicle wheels is the front wheel on the outside of the curve. This information is contained in quantities or signals S6. This information may be, for example, a turn flag indicating to block 205 whether the vehicle is turning right or left. A step 303 is carried out after step 302. In step 303 a check is performed to determine whether a condition for termination is met, i.e., a termination condition of the stabilization control measure on the front wheel on the inside of the curve. The partial conditions, which are to be checked as part of the termination conditions, are checked only in the case when the actuators of the front wheel on the inside of the curve are activated according to the present invention. In a first partial condition, a check is performed to determine whether the driver is taking his foot off the brake pedal. In a second partial condition, a check is performed to determine whether the direction of turning is changing. The check of the two partial conditions takes place in block 208. The information necessary for this is contained in signals or quantities S4. For the first partial condition, information regarding operation of the brake pedal is necessary. In other words, signal BLS itself or a signal derived from this signal is contained in S4. The first partial condition is checked for the following reason. If the driver is taking his foot off the brake pedal, i.e., if he is releasing the brake pedal, the braking effect is automatically reduced. It is then no longer necessary to activate the actuators for the front wheel on the inside of the curve, i.e., stabilization according to the present invention is no longer necessary. The second partial condition is analyzed because the front wheel on the inside of the curve changes when the direction of turning changes. In other words, the previous actuators need no longer be activated. Instead, the actuators of the other front wheel must be activated. The termination condition is met if it is found during activation of the actuators of the front wheel on the inside of the curve according to the present invention that the first or second partial condition is met. If the termination condition is met, then a step 304 is carried out following step 303. In this step, the value 0 is assigned to a quantity StabinVR indicating whether the actuators of the front wheel on the inside of the curve are being activated according to the present invention, because activation of the actuators of the front wheel on the inside of the curve according to the present invention is terminated. Following step 304, a step 305 is carried out. However, if it is found in step 303 that the termination condition is not met, then step 305 is carried out immediately after step 303.

A check is performed in step 305 to determine whether a conformity condition for the determination of setpoint vsollinVR and deviation quantity AbinVR is met. In this connection, the following partial conditions are checked: in a first partial condition, a check is performed to determine whether none of the front wheels is going into brake slip control. In a second partial condition, a check is performed to determine whether tire tolerance compensation, which is to be performed as part of brake slip control, is being performed properly. At this point, reference is made to German Published Patent Application No. 42 30 295 with regard to the technical implementation of tire tolerance compensation. It shall only be pointed out here that different tire radii can be detected with the help of tire tolerance compensation and taken into account in traction control which relies on wheel rpm in such a way that the different tire radii are compensated. In a third partial condition, a check is performed to determine whether brake slip control is allowed, i.e., whether the system needed for brake slip control is intact. The check on the conformity condition also takes place in block 208. The information necessary for this is also contained in signals or quantities S4. Information regarding the status of the front wheels, i.e., whether or not at least one of the front wheels is in brake slip control, is necessary for the first partial condition. The first partial condition is carried out for the following reason: in the case when a control measure on the front wheel on the inside of the curve is implemented according to the present invention and nevertheless a control measure of the brake slip control system is also necessary on this wheel, the control measure according to the present invention is to be terminated so that the brake slip control system can assume control of the front wheel on the inside of the curve without being influenced by the control measures according to the present invention. Thus, with the help of the first partial condition, the transition from a control measure according to the present invention to a control measure of the brake slip control system is monitored. Information for the second and third partial conditions is made available in the form of suitable flags. The second and third partial conditions are checked for this reason because intact wheel rpm signals are necessary to carry out the method according to the present invention. If the system required for carrying out the brake slip control system according to the present invention is not intact or if there is a problem in tire tolerance compensation, then it may be assumed that the wheel rpm sensors are defective or the signals generated with the wheel rpm sensors cannot be used. The conformity condition is met when all three partial conditions are met. If it is found in step 305 that the conformity condition is met, then a step 306 is carried out following step 305. However, if it is found in step 305 that the conformity condition is not met, then a step 311 is carried out following step 305. Quantity StabinVR is assigned a value of zero in step 311, because in this case, the actuators of the front wheel on the inside of the curve cannot be activated because of the absence of the setpoint or the deviation quantity. Following step 311, a step 315 with which the method according to the present invention is terminated is carried out. The result of the check on the conformity condition is sent by means of quantities or signals S5 from block 208 to block 205, where the setpoint and the deviation quantity are determined.

In the case of a brake slip control system having a transverse acceleration sensor (see optional diagram in FIG. 2), another partial condition is checked in step 305. In this partial condition, a check is performed to determine whether the transverse acceleration sensor has failed, and a value for the transverse acceleration determined from the wheel speeds, preferably the wheel speeds of the non-driven wheels, more or less as a function of a recoil level, is used instead of the transverse acceleration sensor value. In other words, in this partial condition, a check is performed to determine whether the value supplied by the transverse acceleration sensor is in order and can thus be used. Taking into account this additional partial condition, the conformity condition is met when the partial conditions mentioned previously in conjunction with step 305 and this additional partial condition is met.

Setpoint vsollinVR for the wheel speed of the front wheel on the inside of the curve is determined is step 306. This determination takes place in block 205. Setpoint vsollinVR is determined as a function of the wheel speed of the wheel on the outside of the curve which is on the same axle as the wheel on the inside of the curve. In determination of the setpoint, the difference between wheel speeds of the wheel on the inside of the curve and the wheel on the outside of the curve, which results from traveling along a curve, is taken into account. This is done as a function of a quantity which describes the radius of the curve being traveled and is determined as a function of the vehicle speed and the transverse acceleration acting on the vehicle. Essentially, setpoint vsollinVR is determined in two steps. First, an intermediate quantity is determined as a function of the wheel speed of the wheel on the outside of the curve, which is on the same axle as the wheel on the inside of the curve, and a quantity describing the radius of the curve being traveled, this intermediate quantity describing the wheel speed to be expected for the wheel on the inside of the curve as a result of traveling along a curve. In this first step, a quantity which describes the geometry of the vehicle, namely the wheel base of the vehicle, is also taken into account. This is usually the track width of the front axle. However, it may also be the wheel base of the rear axle or an average value obtained from the wheel base of the front axle and the wheel base of the rear axle. In a second step, setpoint vsollinVR is determined from this intermediate quantity by weighting the intermediate quantity with a predetermined factor. Since the predetermined factor is less than 1, the setpoint is less than the intermediate quantity. This factor may be a fixed predetermined value which is determined in advance in the context of the application or as an alternative this factor may also be calculated during operation of the vehicle. This calculation may be performed as a function of vehicle speed, transverse acceleration, longitudinal acceleration and a quantity describing the condition of the road surface, in particular the coefficient of friction. Information with regard to different coefficients of friction for each side may also be included here. In determination of setpoint vsollinVR, it is a ultimately irrelevant whether or not there is any slip on the wheel on the outside of the curve.

After step 306, a step 307 is carried out to determine deviation quantity AbinVR as function of setpoint vsollinVR. This determination also takes place in block 205. The deviation quantity describes the deviation between the wheel speed determined for the front wheel on the inside of the curve and the setpoint determined step 306. Specifically, the deviation quantity is determined as the difference, based on the setpoint, between the wheel speed determined for the front wheel on the inside of the curve and the setpoint. In other words, in a corresponding weighting with factor 100, deviation quantity AbinVR corresponds to the percentage deviation of the wheel speed measured for the front wheel on the inside of the curve from setpoint vsollinVR. Following step 307, a step 308 is carried out. In this step, the deviation quantity is filtered with the help of a suitable filter means, preferably a PT1 element, thus yielding filtered deviation quantity AbinVRfil. Filtering takes place in block 206.

Following step 308, a step 309 is carried out in which a release condition is checked. The release condition is composed of several partial conditions. In a first partial condition, a check is performed to determine whether the actuators of the front wheel on the inside of the curve are being activated according to the present invention. If the actuators of the front wheel on the inside of the curve are already being activated according to the present invention, then it can be assumed that this activation will continue. In this case, it would not be necessary to check on other partial conditions. However, if no activation according to the present invention is being carried out, the following partial conditions two through five become more important, because it can be determined on the basis of these partial conditions whether activation according to the present invention is necessary. In a second partial condition, a check is performed to determine whether the transverse acceleration is greater than a corresponding predetermined value. If the value of the transverse acceleration is greater than the predetermined value, this is a driving condition in which instability of the vehicle might become possible, consequently necessitating activation of the actuators of the front wheel on the inside of the curve according to the present invention. In a third partial condition, a check is performed to determine whether the vehicle speed is greater than a corresponding predetermined value. For the third partial condition it is also true that in the case when the predetermined value is exceeded, the prevailing driving status is one in which instability of the vehicle is to be counteracted. In a fourth partial condition, a check is performed to determine whether the vehicle deceleration—preferably the absolute value of the filtered vehicle deceleration is taken into account—is greater than a predetermined value. A release can be implemented on the basis of the fourth partial query if the vehicle deceleration is great. In other words, if there is little deceleration, then no control measure according to the present invention is necessary. However, if there is great vehicle deceleration, a control measure according to the present invention may be allowed. In a fifth partial condition, a check is performed to determine whether the filtered deviation quantity is less than a corresponding predetermined value.

The information necessary as part of the five partial conditions listed above is sent to block 208, where the release condition is checked, with the help of signals S4. The release condition is met when all five partial conditions are met at the same time.

If the release condition is met, then following step 309, a step 310 is carried out. In this step, the value 1 is assigned to variable StabinVR because the actuators of the front wheel on the inside of the curve must be activated according to the present invention. Following step 310, a step 312 is carried out, performing a check to determine whether quantity StabinVR has a value of 1. If this is the case, which is equivalent to the conclusion that the actuators of the front wheel on the inside of the curve must be activated according to the present invention, then a step 313 is carried out following step 312, initiating activation of the actuators of the front wheel on the inside of the curve according to the present invention. However, if quantity StabinVR does not have a value of 1, then step 315 is carried out following step 312. However, if it is found in step 309 that the release condition is not met, then step 312 is carried out directly following step 309.

In step 313, a check is performed to determine whether filtered deviation quantity AbinVRfil is less than a lower threshold value USW. If this is the case, then after step 313, a step 314 is carried out in which the actuators of the wheel on the inside of the curve are activated so that the braking effect on this wheel is reduced. Since the brake system on which this embodiment is based is a hydraulic brake system, in the concrete case the brake pressure on the front wheel on the inside of the curve is to be reduced. Step 315 is carried out after step 314.

However, if it is found in step 313 that filtered deviation quantity AbinVRfil is greater than lower threshold value USW, then a step 316 is carried out following step 313. In this step a check is performed to determine whether filtered deviation quantity AbinVRfil is less than an upper threshold value OSW. If this is the case, then a step 317 is carried out following step 316. In this step, the actuators of the front wheel on the inside of the curve are activated so that the brake pressure for this wheel is maintained. Following step 317, step 315 is carried out. If, however, it is found in step 316 that the filtered deviation quantity is greater than upper threshold value OSW, then a step 318 is carried out following step 316. In this step the actuators of the front wheel on the inside of the curve are activated so that the brake pressure on this wheel is reduced. Following step 318, step 315 is also carried out.

Both the buildup and reduction in pressure take place in the form of pulse trains. The pulse times and pause times may be fixed in a predetermined manner or by adaptation. The pressure buildup pulse train has a filling pulse. The filling pulse represents the first buildup pulse with which the brake shoes are applied to the brake drums or brake discs before establishing the actual braking effect. Therefore, an accurate adjustment of the braking effect is achieved.

In a modified variant of this embodiment, in step 316 in addition to the check already described, another condition is checked to determine whether the filtered deviation quantity is less than the upper threshold value. Checking this additional condition determines whether an increase in braking effect on the wheel on the inside of the curve is to be suppressed and whether the braking effect is to be retained instead of that. This additional condition is composed of several partial conditions. In a first partial condition, a check is performed to determine whether the vehicle speed is less than a corresponding threshold value. In a second partial condition, a check is performed to determine whether the filtered vehicle deceleration is greater than a corresponding threshold value. In a third partial condition, a check is performed to determine whether the period of time during which the brake pressure is maintained is less than a corresponding threshold value. The first and second partial conditions are checked for the following reason: in activating the actuators of the front wheel on the inside of the curve according to the present invention, the load on the wheel on the inside of the curve is increased again because of the decreasing transverse acceleration as the vehicle travels more slowly and the radius of the turn remains the same. This leads to a reduction in slip on this wheel. Therefore, there may be a buildup of pressure on this wheel. This buildup of pressure is not absolutely necessary at a low speed and low deceleration. Instead, it has a negative effect on pedal comfort due to the buildup pulse train as long as the admission pressure level has not yet been reached. To suppress this negative effect on pedal comfort, a pressure buildup is suppressed in such a situation and instead the pressure is maintained. The third partial query ensures that the implementation of holding the pressure instead of building up the pressure takes place only for a defined period of time.

Steps 312, 313, 314, 316, 317 and 318 are carried out in block 208. The information required for this is sent to block 208 with the help of signals or quantities S4. The results, i.e., the information regarding whether the brake pressure is to be built up, maintained or reduced, is sent to the control core with the help of signals or quantities S3.

Figure 4:
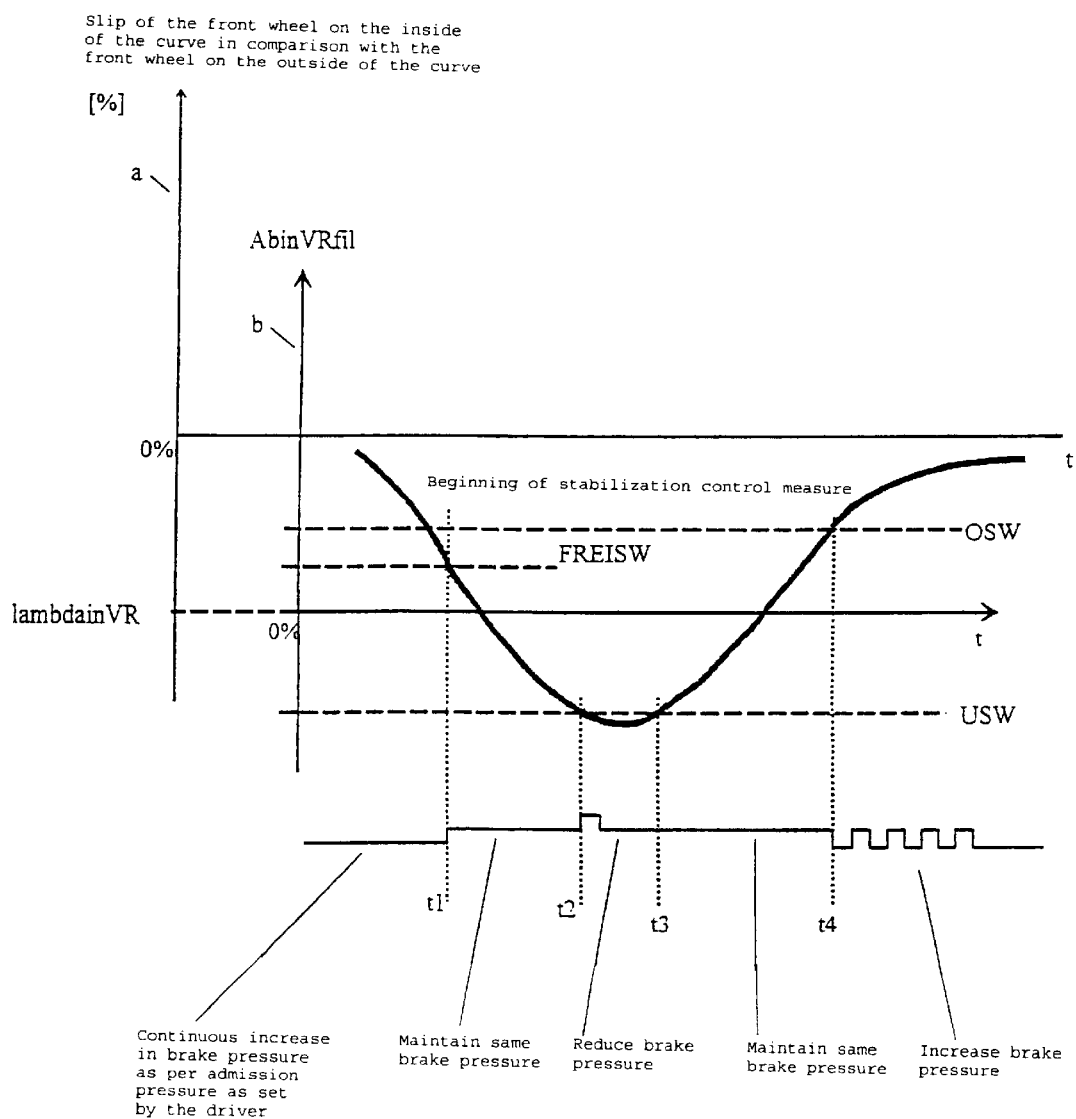
FIG. 4 shows a filtered deviation quantity over time in conjunction with activation of the actuators assigned to the front wheel on the inside of a curve.

FIG. 4 shows the filtered deviation quantity over time in conjunction with activation of the actuators assigned to the front wheel on the inside of the curve. In particular, FIG. 4 shows how the actuators of the front wheel on the inside of the curve are to be activated as a function of the comparison of filter deviation quantity AbinVRfil with upper threshold value OSW and lower threshold value USW. Until time t1 there is a continuous buildup in pressure which is determined by the admission pressure set by the driver. The actuators of the wheel on the inside of the curve according to the present invention have not yet been activated by this time. At time t1, it is found on the basis of the fact that filtered deviation quantity AbinVRfil is below threshold value FREISW (fifth partial condition in step 309) that the actuators of the front wheel on the inside of the curve are to be activated according to the present invention. Since filtered deviation quantity AbinVRfil is between the upper and lower threshold value within the period of time defined by times t1 and t2, the actuators of the front wheel on the inside of the curve are activated first so that the brake pressure is maintained. Beginning at time t2, the filtered deviation quantity is below the lower threshold value, which is maintained until time t3. For this reason, the actuators of the front wheel on the inside of the curve are activated during this period of time so that the brake pressure for the front wheel on the inside of the curve is reduced. During the period of time defined by times t3 and t4, the filtered deviation quantity is again between the upper and lower threshold values. Activation of the actuators of the front wheel on the inside of the curve corresponds to the period of time defined by times t1 and t2. After time t4, the filtered deviation quantity exceeds the upper threshold value. Therefore, the actuators of the front wheel on the inside of the curve are activated so that the brake pressure is increased. The following should be pointed out here. If the brake system does not have means with which the pressure can be increased above the level selected by the driver, then the pressure can be increased only up to the level preselected by the driver. FIG. 4 shows two coordinate systems a and b. In coordinate system a, slip lambdainVR of the front wheel on the inside of the curve is shown in comparison with that of the front wheel on the outside of the curve. This slip enters into forming the factor with which the setpoint is determined from the intermediate quantity. Coordinate system b shows the curve for filtered deviation quantity AbinVRfil as a function of time. As FIG. 4 shows, the slip difference between the front wheel on the inside of the curve and that on the outside of the curve is kept in a definable band around a definable setpoint.

The form of the embodiment selected in the description as well as the representation selected in the figures should not have any restrictive effect on the essential idea according to the present invention. Stabilization of the vehicle is implemented in the embodiment described above merely by activating the actuators for the front wheel on the inside of the curve. Of course, it is also possible to control the rear wheel on the inside of the curve accordingly. In addition, control of one of the wheels on the outside of the curve is also conceivable. In this case, however, to produce a yaw moment counteracting oversteering, it is necessary to increase the braking effect rather than reducing it. In other words, the latter case can be implemented only with a brake system which has the option of increasing the braking effect independently of the driver. This is obviously impossible with a brake system with which only brake slip can be regulated. However, brake systems equipped with traction control or brake systems like those described in the ATZ article mentioned above would offer such an option. In addition, use of the method according to the present invention is not limited to hydraulic and pneumatic brake systems. Use in electrohydraulic, electropneumatic or electromechanical brake systems is also possible.

What is claimed:

1. A method of stabilizing a vehicle equipped with a slip-controlled brake system, comprising:

determining wheel speeds for individual wheels of the vehicle;

determining a setpoint for the wheel speed of at least one of the wheels, wherein the at least one wheel is disposed on an inside of a curve;

determining a deviation quantity for the at least one wheel, wherein the deviation quantity describes a deviation between the wheel speed determined for the at least one wheel and the setpoint;

assigning actuators to the at least one wheel;

activating the actuators as a function of the deviation quantity to stabilize the vehicle determining an intermediate quantity describing the wheel speed of the at least one wheel disposed on the inside of the curve as a function of at least one of:
the wheel speed of one of the individual wheels on an outside of the curve on the same axle as the at least one wheel disposed on the inside of the curve, and
a quantity describing a radius of the curve;

determining the setpoint by weighting the intermediate quantity with a predetermined factor; and reducing the setpoint by a predetermined amount in comparison with the intermediate quantity due to the weighting.

2. A method of stabilizing a vehicle equipped with a slip-controlled brake system, comprising:

determining wheel speeds for individual wheels of the vehicle;

determining a setpoint for the wheel speed of at least one of the wheels, the at least one wheel being disposed on an inside of a curve;

determining a deviation quantity for the at least one wheel, wherein the deviation quantity describes a deviation between the wheel speed determined for the at least one wheel and the setpoint;

assigning actuators to the at least one wheel; and activating the actuators as a function of the deviation quantity to stabilize the vehicle;

wherein the method further comprises at least one of the steps of:
determining a difference based on the setpoint between the wheel speed determined for the at least one wheel and the setpoint as the deviation quantity; and
performing the steps of:
filtering the deviation quantity, and
activating the actuators as a function of the filtered deviation quantity.

3. The method according to claim 2, wherein:

the step of filtering the deviation quantity is performed in accordance with a PT1 element.

4. A method of stabilizing a vehicle equipped with a slip-controlled brake system, comprising:

determining wheel speeds for individual wheels of the vehicle;

determining a setpoint for the wheel speed of at least one of the wheels;

determining a deviation quantity for the at least one wheel, wherein the deviation quantity describes a deviation between the wheel speed determined for the at least one wheel and the setpoint;

assigning actuators to the at least one wheel;

activating the actuators as a function of the deviation quantity to stabilize the vehicle; and controlling the actuators as a function of a comparison between the deviation quantity and an upper threshold value and a lower threshold value so that the deviation quantity is at least one of within and brought into a value range defined by the upper threshold value and the lower threshold value.

5. The method according to claim 4, wherein the controlling of the actuators is effected so that a braking effect on the at least one wheel is at least one of:

reduced when the deviation quantity is less than the lower threshold value, maintained when the deviation quantity is greater than the lower threshold value and less than the upper threshold value, and increased when the deviation quantity is greater than the upper threshold value.

6. The method according to claim 5, further comprising the steps of:

checking whether a condition according to which an increase in the braking effect on the at least one wheel is to be suppressed is met; and if the condition is met, maintaining the braking effect at a same level instead of increasing the braking effect.

7. A method of stabilizing a vehicle equipped with a slip-controlled brake system, comprising:

determining wheel speeds for individual wheels of the vehicle;

determining a setpoint for the wheel speed of at least one of the wheels;

determining a deviation quantity for the at least one wheel, wherein the deviation quantity describes a deviation between the wheel speed determined for the at least one wheel and the setpoint;

assigning actuators to the at least one wheel; and activating the actuators as a function of the deviation quantity to stabilize the vehicle;

wherein the method further comprises at least one of the steps of:
determining at least one of the setpoint and the deviation quantity when a corresponding conformity condition is met;

releasing an activation of the actuators when a corresponding release condition is met; and terminating the activation of the actuators when a corresponding termination condition is met.

* * * * *